(12) United States Patent
Ruel

(10) Patent No.: US 8,456,668 B1
(45) Date of Patent: Jun. 4, 2013

(54) METHODS AND SYSTEMS FOR CROSS-PROCESS PRINTING

(75) Inventor: Marc-Antoine Ruel, Quebec (CA)

(73) Assignee: Google Inc., Mountain View, CA (US)

( * ) Notice: Subject to any disclaimer, the term of this patent is extended or adjusted under 35 U.S.C. 154(b) by 1315 days.

(21) Appl. No.: 12/200,712

(22) Filed: Aug. 28, 2008

(51) Int. Cl.
*G06F 3/12* (2006.01)
*G06K 15/00* (2006.01)

(52) U.S. Cl.
USPC ....... 358/1.15; 358/1.13; 358/1.16; 358/1.17; 358/403; 358/468

(58) Field of Classification Search
USPC ............... 358/1.1, 1.15, 468, 403, 1.18, 1.14, 358/1.13, 1.17, 1.16
See application file for complete search history.

(56) References Cited

U.S. PATENT DOCUMENTS

| | | | | |
|---|---|---|---|---|
| 5,751,919 A * | 5/1998 | Goodwin, III | ................. | 358/1.1 |
| 5,873,659 A * | 2/1999 | Edwards et al. | ................. | 400/61 |
| 6,067,560 A * | 5/2000 | Potts, Jr. | ....................... | 709/203 |
| 6,184,996 B1 * | 2/2001 | Gase | ............................ | 358/1.15 |
| 6,327,045 B1 * | 12/2001 | Teng et al. | .................... | 358/1.15 |
| 6,631,010 B1 * | 10/2003 | Foster et al. | ................. | 358/1.15 |
| 6,650,433 B1 * | 11/2003 | Keane et al. | ................. | 358/1.15 |
| 6,738,841 B1 * | 5/2004 | Wolff | ............................. | 710/62 |
| 6,809,831 B1 * | 10/2004 | Minari | ......................... | 358/1.15 |
| 7,167,260 B2 * | 1/2007 | Iwata et al. | .................. | 358/1.15 |
| 7,180,615 B2 * | 2/2007 | Price et al. | ................... | 358/1.15 |
| 7,526,620 B1 * | 4/2009 | McGovern | .................... | 711/159 |
| 8,149,431 B2 * | 4/2012 | Barton et al. | ................. | 358/1.13 |
| 8,184,324 B2 * | 5/2012 | Chang et al. | ................. | 358/1.15 |
| 2002/0196460 A1 * | 12/2002 | Parry | ............................ | 358/1.15 |
| 2010/0091318 A1 * | 4/2010 | Ferlitsch | ..................... | 358/1.15 |

OTHER PUBLICATIONS

"Explore the Features: Internet Explorer 7 printing", downloaded from http://www.microsoft.com/windows/windows-vista/features/ie7-printing.aspx, on Jul. 15, 2008, 2 pages.

* cited by examiner

*Primary Examiner* — Dennis Dicker
(74) *Attorney, Agent, or Firm* — Sterne, Kessler, Goldstein & Fox P.L.L.C.

(57) ABSTRACT

The present invention relates to printing from a restricted process. An embodiment includes receiving a request to print content at a restricted process, providing the request to print content to a privileged process, retrieving configuration information using the privileged process, processing the configuration information using the restricted process, generating one or more drawing commands using the restricted process and providing the drawing commands to the privileged process. Another embodiment includes, receiving a command to print content at a restricted process, providing at least the command to a privileged process, receiving configuration information from the privileged process and generating one or more drawing commands based on the configuration information using the restricted process, generating a serialized buffer of the content based on the configuration information and providing the serialized buffer and the drawing commands to the privileged process. In this way, a restricted process may print data without directly communicating with the printer leading to a more secure computing environment.

18 Claims, 5 Drawing Sheets

METHODS AND SYSTEMS FOR CROSS-PROCESS PRINTING

BACKGROUND

1. Field of the Invention

The present invention relates to computer processes, and more particularly to communication between printers and computer process(es).

2. Background Art

In computing, a process is an instance of a computer program that is being executed by a computer system. Present day computer systems execute a plurality of processes at any given time and have the ability to run several computer programs concurrently.

Processes associated with computer systems may carry out various tasks ranging from rendering images to printing. In most cases, processes need access to appropriate system resources to perform their tasks. For example, a process that needs to print data needs to access a printer prior to transmitting data to the printer.

Processes have certain attributes, known as credentials or privileges, that reflect their ability to perform various operations. In some computing environments, processes are restricted from accessing certain computer resources. Processes may be restricted from accessing certain computer resources for security reasons and also to prevent malicious use of system resources.

To access a printer or any other resource that allows printing, some restricted processes open a direct communication channel to the printer. However, when a restricted process opens a direct communication channel with a printer, it inherently means that this process may not be restricted enough to provide a secure computing environment.

Systems and methods are needed that allow restricted processes to access printer devices and other output devices without directly communicating with such devices.

BRIEF SUMMARY

The present invention relates to printing from a restricted process. In an embodiment, a restricted process receives a request to print content. A privileged process then retrieves configuration information associated with the printer or printing device and provides it to the restricted process. The restricted process may then generate drawing commands and a serialized buffer of the content to be printed based on the configuration information. The privileged process may then send the drawing commands and the serialized buffer to a printer or any other printing device.

In this way, a restricted process may print data without directly communicating with the printer leading to a more secure computing environment.

Further embodiments, features, and advantages of the invention, as well as the structure and operation of the various embodiments of the invention are described in detail below with reference to accompanying drawings.

BRIEF DESCRIPTION OF THE DRAWINGS

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
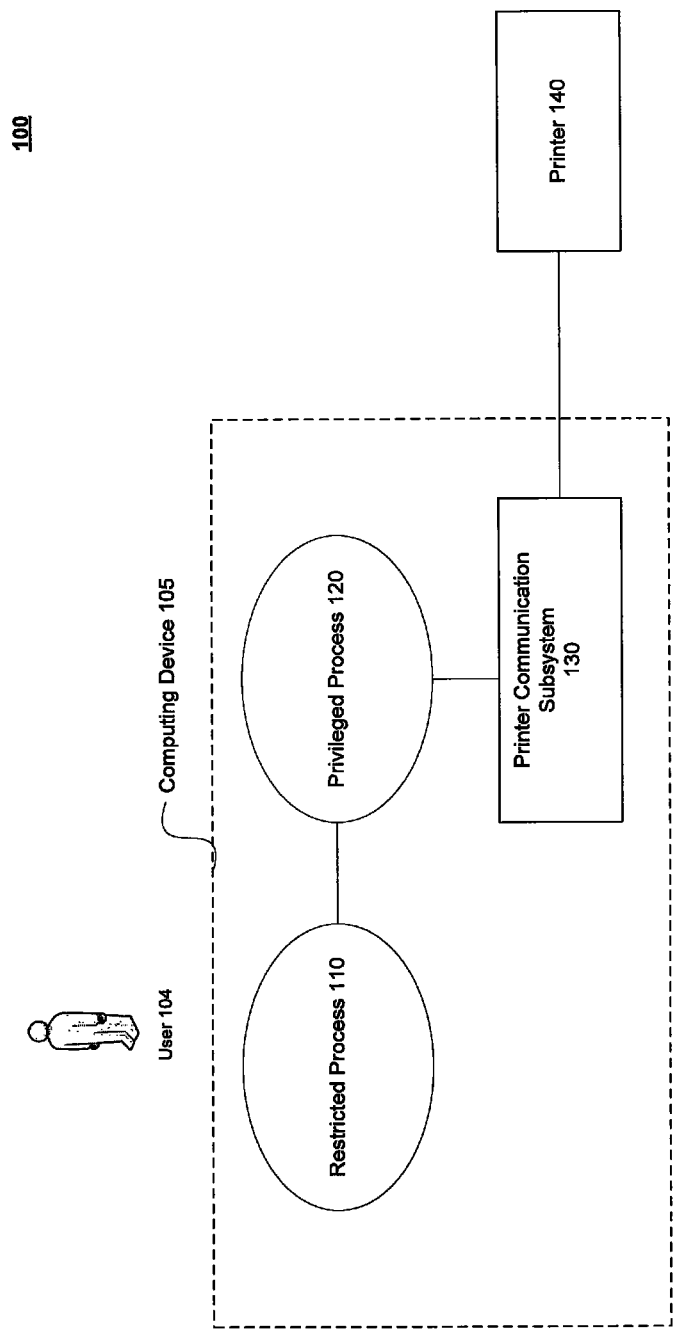
FIG. 1 is a diagram of a system for printing from a restricted process, according to an embodiment of the invention.

The present invention relates to printing from a restricted process. A system embodiment includes a restricted process to provide one or more drawing commands, and a privileged process to provide the drawing commands to a printer communication subsystem, wherein the printer communication subsystem generates one or more raw printer commands from the printer commands. A method embodiment includes receiving a request to print content from a restricted process, providing the request to print content to a privileged process, retrieving configuration information using the privileged process, processing the configuration information using the restricted process, generating one or more drawing commands using the restricted process, and providing the drawing commands to the privileged process.

In this way, a restricted process may print data without directly communicating with the printer leading to a more secure computing environment.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The term "process" used herein refers to an instance of a computer program being executed by a computer system. A computer system or any computing environment may instantiate and execute one or more processes to perform a variety of tasks. This example is illustrative and is not intended to limit the invention.

The term "restricted process" used herein refers to any process instantiated within a computing environment that may not be able to directly communicate with certain resources within the computing environment. As an example, the resources may include output devices such as printers, drivers controlling such printers, display devices or input devices. A restricted process, for example, may be an instance of a rendering engine associated with a web browser, an example of which is described in U.S. Provisional Patent Application No. 61/052,719, filed May 13, 2008, entitled "Multi-Process Browser Architecture," which is incorporated herein by reference in its entirety. This example is illustrative and is not intended to limit the invention.

The term "privileged process" used herein refers to any process instantiated within a computing environment that is able to communicate directly with certain resources within the computing environment that a restricted process may not be able to communicate with directly. As an example, a privileged process may be able to communicate directly with a device such as a printer, driver controlling such a printer, a display device or an input device. These examples are illustrative and are not intended to limit the invention.

This detailed description of the embodiments of the present invention is divided into several sections as shown by the following table of contents

TABLE OF CONTENTS

1. System
2. Exemplary Operation
3. Exemplary Cross-Process Data Flow
   3.1 Configuration Information
   3.2 Content Serialization and Sanitization
   3.3 Printer Commands and Raw Printer Commands
4. Automatic Query of Printer Settings 1. System This section describes a system for printing from a restricted process according to an embodiment of the invention illustrated in FIG. 1. FIG. 1 is an diagram of system 100 that may be used to print from a restricted process which cannot communicate directly with a printer.

System 100 includes computing device 105. Computing device 105 can be any type of computing device having one or more processors. For example, computing device 105 can be a workstation, mobile device, computer, cluster of computers, set-top box, or other device having at least one processor. Such a computing device may include software, firmware, hardware, or a combination thereof. Software may include one or more applications and an operating system. Hardware can include, but is not limited to, a processor, memory and graphical user interface display.

According to an embodiment, computing device 105 may include restricted process 110, privileged process 120, printer communication subsystem 130 and printer 140. (While the following is described in teams of web browsers and printers, the invention is not limited to this embodiment and other query content retrieval and viewing mechanisms may be used. Additionally, different types of output devices may be used in place of a printer. The invention is applicable to any system having generally the structure of FIG. 1 or an equivalent thereof, or that would benefit from the functions as described herein.)

Restricted process 110 is a process instantiated within system 100 that may have limited or no access to certain system resources. In an embodiment, restricted process 110 may not be able to directly communicate with printer 140. As an example, not intended to limit the invention, restricted process 110 may be an instance of any application that may be instantiated system 100. Additionally, for example, restricted process 110 may be a web based application that may be instantiated within a web browser. The INTERNET EXPLORER browser from MICROSOFT is a type of web browser. Other examples of browsers are the SAFARI browser from APPLE, the OPERA browser from OPERA SOFTWARE, the FIREFOX browser from MOZILLA and the CAMINO browser available at http://www.caminobrowser.org/. In still another example, restricted process 110 and privileged process 120 may be separate processes that are instantiated in a multi-process browser architecture, an example of which is described in U.S. Provisional Patent Application No. 61/052,719, filed May 13, 2008, entitled "Multi-Process Browser Architecture," which is incorporated herein by reference in its entirety.

Privileged process 120 may be a process instantiated within system 100 that is able to communicate directly with certain system resources with which the restricted process 110 is not able to communicate directly. In an embodiment, privileged process 120 may communicate directly with printer 140 through printer communication subsystem 130. Restricted process 110 may communicate with privileged process 120. Communication between privileged process 120 and restricted process 110 is described in detail further in the description.

Printer communication subsystem 130 allows privileged process 120 to communicate with printer 140. As an example, privileged process 120 may send printer commands to printer communication subsystem 130. Printer communication subsystem 130 may then convert the printer commands to raw printer commands. Printer communication subsystem 130 then forwards the raw printer commands to printer 140. In an embodiment, printer communication subsystem 130 may provide printer configuration information to privileged process 120. Printer commands and printer configuration information are described in detail further in the description.

Printer 140 may be any form of printing device that prints data on a physical medium. Printer 140 may receive raw printer commands from printer communication subsystem 130. Printer 140 may then print data based on the raw printer commands.

An exemplary overall operation of the system described in FIG. 1 is described in the next section.

2. Exemplary Operation

Figure 2:
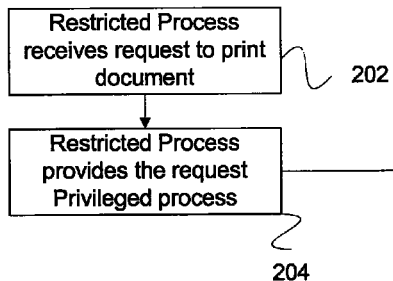
FIG. 2 is a flowchart illustrating various steps in the operation of the system shown in FIG. 1, according to an embodiment of the invention.
Figure 2:
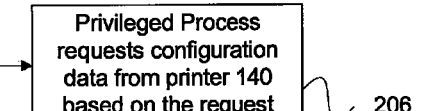
Figure 2:
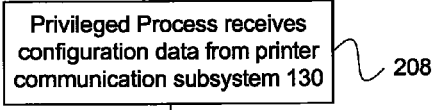
Figure 2:
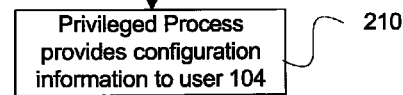
Figure 2:
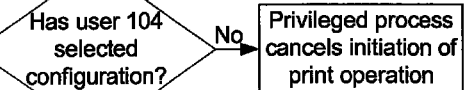
Figure 2:
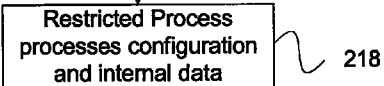
Figure 2:
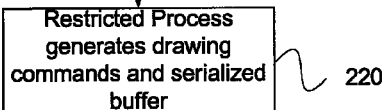
Figure 2:
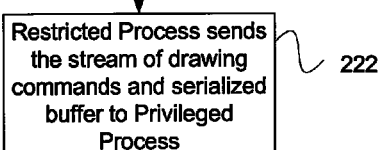

FIG. 2 is a flowchart illustrating an exemplary overall operation of system 100.

Method 200 begins with restricted process 110 receiving a request to print data (step 202). As an example, restricted process 110 may receive a request to print content from user 104. User 104, for example, may provide a request to print content through a print menu in an application associated with restricted process 110. Applications may include web browsers, image editing tools, word processing tools or other applications used in computing environments. In the example where the application is a web browser, user 104 may provide a request to print web content. A printing operation may be initiated by restricted process 110. As an example, JAVASCRIPT commands may be used to initiate a printing operation.

Restricted process 110 may then provide the request to print data received in step 202 to privileged process 120 (step 204).

Privileged process 120 may then request configuration information from printer 140 (step 206). As an example, configuration information may include settings related to resolution, font and page layout associated with printer 140.

Privileged process 120 may then receive configuration information from printer communication subsystem 130 (step 208).

Privileged process 120 then provides the configuration information received in step 206 to user 104 through restricted process 110 (step 210). As an example, configuration information may be presented by restricted process 110 in the form of a graphical user interface menu to user 104 that allows user 104 to select a configuration. Configuration information that is presented may allow user 104 to select resolution, font, page layout or other setting.

Privileged process 120 then checks if user 104 has selected a configuration or selected a cancel option (step 212). If a user has selected a cancel option, privileged process 120 cancels initiation of a print operation (step 214). If user 104 has selected a configuration, privileged process 120 sends the selected configuration to restricted process 110 (step 216).

Restricted process 110 then processes the configuration information and any other internal data (step 218). As an example, configuration information may include a printer name, printer characteristics and other printer related information.

Restricted process 110 then generates a one or more drawing commands and a serialized buffer of content that is to be printed by printer 140 (step 220). As an example, restricted process 110 may generate one or more streams of drawing commands. Drawings commands may include co-ordinates needed for printing using printer 140. Generation of a serialized buffer and drawing commands is described in detail further in the description below.

Restricted process 110 may then send the drawing commands and the serialized buffer to privileged process 120 (step 222).

Privileged process 120 may then send the drawing commands and the serialized buffer to printer communication subsystem 130 (step 224).

Printer communication subsystem 130 may then generate raw printer commands and provide the raw printer commands to printer 140. As an example, raw printer commands may be printer commands that are specific to printer 140.

In this way, privileged process 120 adds a layer of access control to printer 140. Such access control is in addition to any form of access control that may be provided by an operating system associated with computing device 105, printer communication subsystem 130 or printer 140. Furthermore, controlled access to printer 140 using privileged process 120 can be based on document origin, a web site uniform resource locator (URL), document size or any other parameter. Access control is provided by privileged process 120 without requiring any change to an operating system associated with computing device 105, printer communication subsystem 130, printer 140 or any of their settings. Embodiments of the invention allow access control to be implemented without having a user or a process to implement any changes to computing system 105 that, for example, require operating system level administrative rights. These examples are illustrative and are not intended to limit the invention.

Exemplary data flow and other aspects of system 100 are described in the next section.

3. Exemplary Cross-Process Data Flow

Figure 3:
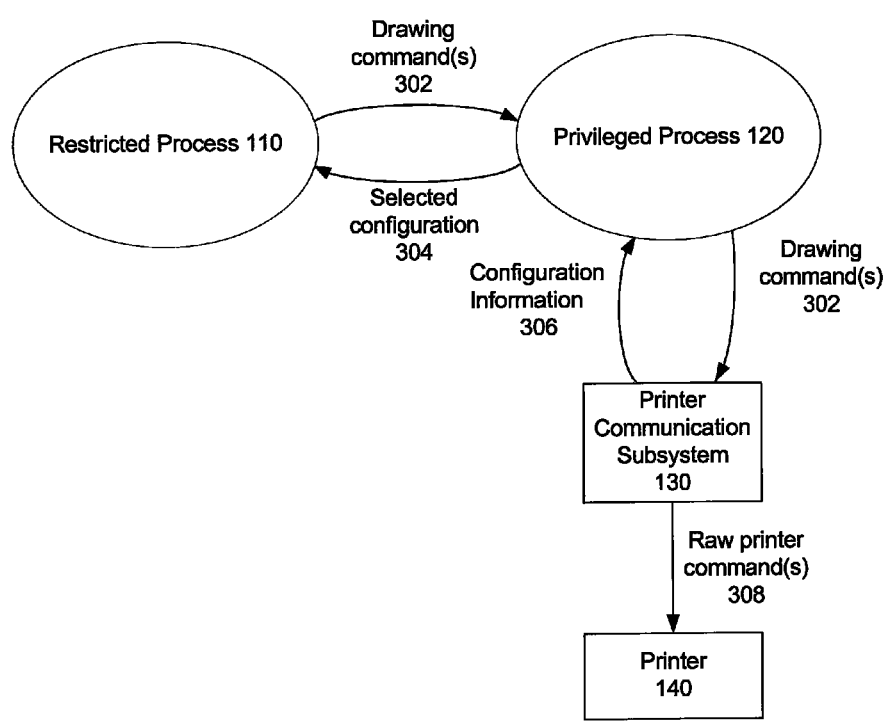
FIG. 3 illustrates data flow that occurs in the system shown in FIG. 1, according to an embodiment of the invention.

FIG. 3 illustrates exemplary data flow that may occur in system 100. FIG. 3 includes restricted process 110, privileged process 120, printer communication subsystem 130 and printer 140.

3.1 Configuration Information

As shown in flow diagram 300 illustrated in FIG. 3, restricted process 110 may provide drawing command(s) 302 to privileged process 120. As an example, restricted process 110 may be a web browser process or a part of a web browser process that may not be able to communicate directly with printer 140. Furthermore, privileged process 120 may be a process that can directly communicate with printer 140 and may instantiate, for example, a direct communication channel (not shown) with printer 140.

Privileged process 120 receives configuration information 306 from printer communication subsystem 130. Configuration information 306 may be provided to restricted process 110. Configuration information 306 may allow user 104 to select a configuration to configure printer 140. As an example, configuration information may be presented in the form of a graphical user interface menu to user 104 that allows user 104 to select a configuration. Configuration information 306 may allow user 104 to configure font size, page size, print quality and other settings that may be associated with printer 140. In an embodiment, privileged process 120 may provide selected configuration 304 (a configuration that has been selected by user 104) to restricted process 110.

3.2 Content Serialization and Sanitization

Restricted process 110 may then use selected configuration 304 to generate a serialized buffer of a document that is to be printed which is then provided as drawing command(s) 302 to privileged process 120. As an example, the serialized buffer may include buffered commands that have not been executed by printer 140.

A serialized buffer of a document may be constructed through a process of serialization. Serialization may include the process of converting the data into a format, for example a binary format that would enable the transmission of the data as a series of bytes. The series of bytes or the format may then be used to re-create data that is identical to the original data. In an embodiment, restricted process 110 may convert content that is to be printed as a series of bytes that may then be transmitted to privileged process 120. As an example, not intended to limit the invention, serialization may be either explicit or implicit serialization or any other serialization technique known to those skilled in the art.

Data that has been serialized into a serialized buffer may be sanitized by restricted process 110 to increase security of cross-process communication, for example, to increase security of data that may flow between restricted process 110 and privileged process 120. Restricted process 110 may sanitize serialized data so that it may not be read by any other process, for example, a malicious process that may intercept communication between restricted process 110 and privileged process 120. Sanitization refers to any modification of restricted data items in a manner that conceals some characteristic of the data items from an unauthorized party or process. In one technique, sanitization can completely randomize data that may be included in content that is being serialized by restricted process 110 such that the data is encrypted and may not be deciphered by any other process that may intercept communication between restricted process 110 and privileged process 120. Sanitization can be performed by replacing the content to be encrypted with random strings of alphanumeric characters. In another technique, sanitization can be performed, for instance, by scrambling data within content that is to be transmitted by restricted process 110, or by substituting fictitious entries within the content. As a result of these measures, it is not possible for an unauthorized party or process to reconstruct a complete content and may increase the security of cross-process communication between restricted process 110 and privileged process 120. Other techniques for data sanitization, known to those skilled in the art may be used and the invention is not restricted to this embodiment.

3.3 Drawing Commands and Raw Printer Commands

Privileged process 120 may then provide drawing command(s) 302 to printer communication subsystem 130. Privileged process 120 can provide drawing command(s) 302 because it is able to directly communicate with printer communication subsystem 130 unlike restricted process 110 which is restricted from communicating with printer communication subsystem 130 and printer 140. In an embodiment, drawing command(s) 302 may include drawing commands and non-drawing commands generated by the restricted process 110. Such drawing commands may include a plurality of generic commands needed to render content in a form that can be printed. Drawing command(s) 302 may also include a serialized buffer of the content being printed by printer 140.

Printer communication subsystem 130 may convert drawing command(s) 302 to raw printer commands 308. Raw printer commands 308 may be commands that are specific to the type of printer associated with printer communication subsystem 130. Additionally, printer communication subsystem 130 receives responses from printer 140 relative to content that has been printed. In an embodiment, communication between printer communication subsystem 130 and printer 140 may use a printer command language. Exemplary printer command languages are HEWLETT PACKARD PRINTER COMMAND LANGUAGE (PCL) and ADOBE POSTSCRIPT. Both of these languages may generate raw printer command(s) 308 in vector form, that is, as mathematical values of geometric shapes, rather than as a series of dots (a bitmap image). In another embodiment, printer communication subsystem 130 may generate raw printer command(s) 308 by rendering all types of drawing commands into bitmap data and delivering the bitmap data together with the necessary raw printer command(s) 308 to printer 140. Printer communication subsystem 130 may also encode any non-drawing commands into print commands as well.

Printer 140 may then take raw printer command(s) 308 and convert them into a bitmap page, for example, and produce printed output on paper or any other physical medium.

In this way, a restricted process may print data without directly communicating with the printer leading to a more secure computing environment.

4. Automatic Query of Printer Settings

In an embodiment, content that is being viewed by a user in a browser or any other web based application which is instantiated as restricted process 110 may be able to automatically query and retrieve configuration information 306 from printer 140 through privileged process 120. Since the web based application is instantiated as a restricted process, and is restricted from accessing printer resources, privileged process 120 is needed to communicate with printer communication subsystem 130 and printer 140. Privileged process 120 may retrieve configuration information 306. Furthermore, retrieval of configuration information 306 may allow users to implement web applications that seamlessly integrate features to choose a printer and its print settings. (While the following is described in terms of an application within a web browser or a web application, the invention is not limited to this embodiment and any other application that is not web or Internet based may be used).

Figure 4A:
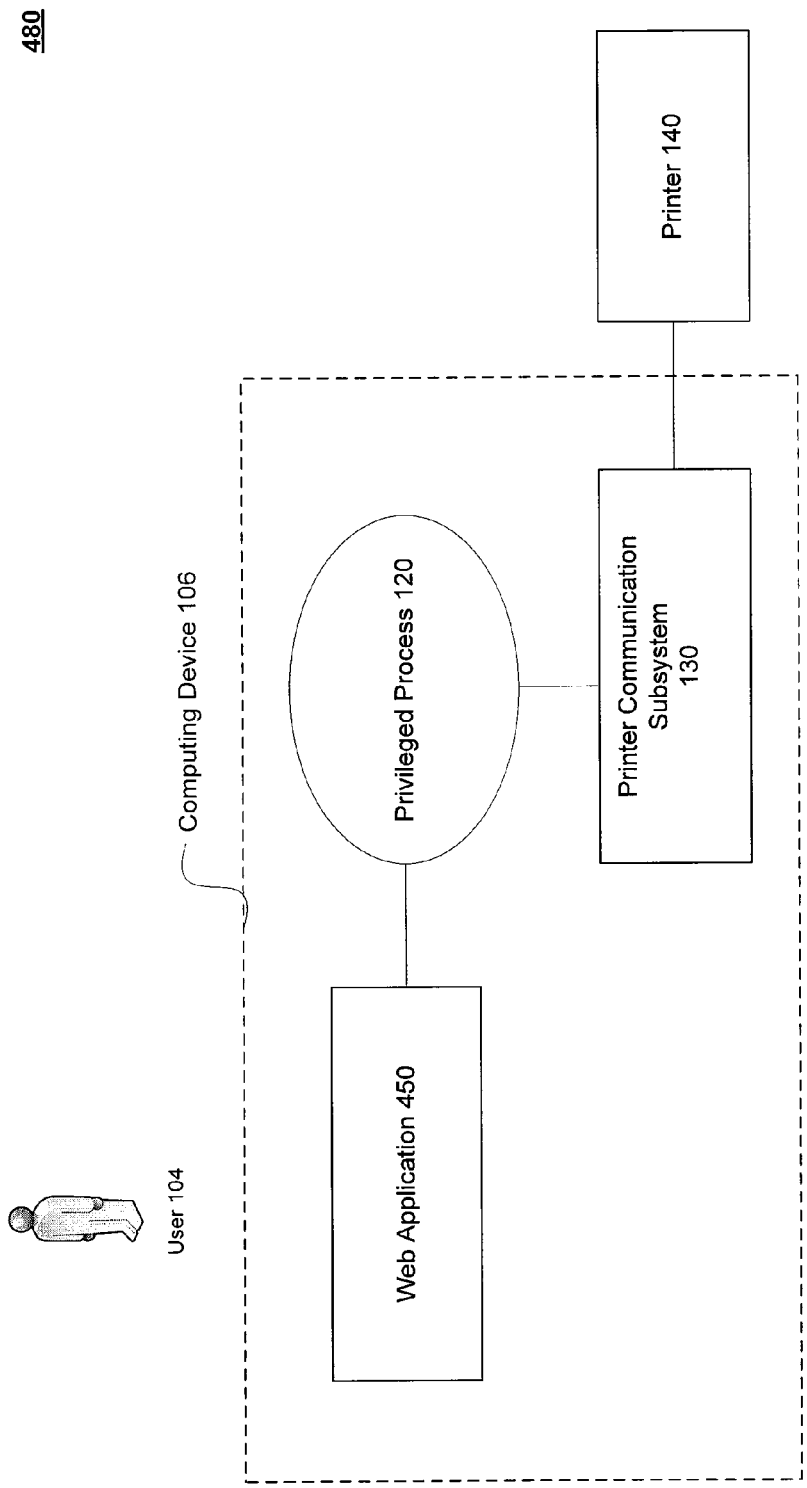
FIG. 4A is a diagram illustrating communication between a web application and a privileged process.

FIG. 4A is a diagram illustrating system 480. System 480 includes computing device 106.

Computing device 106 can be any type of computing device having one or more processors. For example, computing device 106 can be a workstation, mobile device, computer, cluster of computers, set-top box, or other device having at least one processor. Such a computing device may include software, firmware, hardware, or a combination thereof. Software may include one or more applications and an operating system. Hardware can include, but is not limited to, a processor, memory and graphical user interface display.

According to an embodiment, computing device 106 may include web application 450, privileged process 120, printer communication subsystem 130 and printer 140.

Web application 450 may be instantiated as a restricted process that may not be able to communicate directly with printer 140. Web application 450 may include a web browser, an image editing tool, a word processing tool, an interactive map application, an email application, an application that makes use of the AJAX (Asynchronous JavaScript and XML) framework or any application that communicates over a network, such as the Internet, and supports web protocols, standards or services. In examples, content may be represented as hypertext markup language, dynamic hypertext markup language or extendable markup language. In another example, web application 450 may download and execute scripts according to the AJAX framework. The AJAX framework may asynchronously transmit and receive data from a server (not shown) to system 100.

As described earlier, privileged process 120 may be a process instantiated within system 400 that is able to communicate directly with certain system resources that web application 450 is not able to communicate directly with. In an embodiment, privileged process 120 may communicate with printer 140 using printer communication subsystem 130. Web application 450 may communicate with privileged process 120.

Printer communication subsystem 130 allows privileged process 120 to communicate with printer 140. As an example, privileged process 120 may send printer commands to printer communication subsystem 130. Printer communication subsystem 130 may then convert the printer commands to raw printer commands. Printer communication subsystem 130 then forwards the raw printer commands to printer 140. In an embodiment, printer communication subsystem 130 may provide printer configuration information to privileged process 120. Printer configuration information, for example, may include resolution, font, page layout information and any other settings or configuration data.

Printer 140 may be any form of printing device that prints data on a physical medium. Printer 140 may receive raw printer commands from printer communication subsystem 130. Printer 140 may then print data based on the raw printer commands.

Figure 4B:
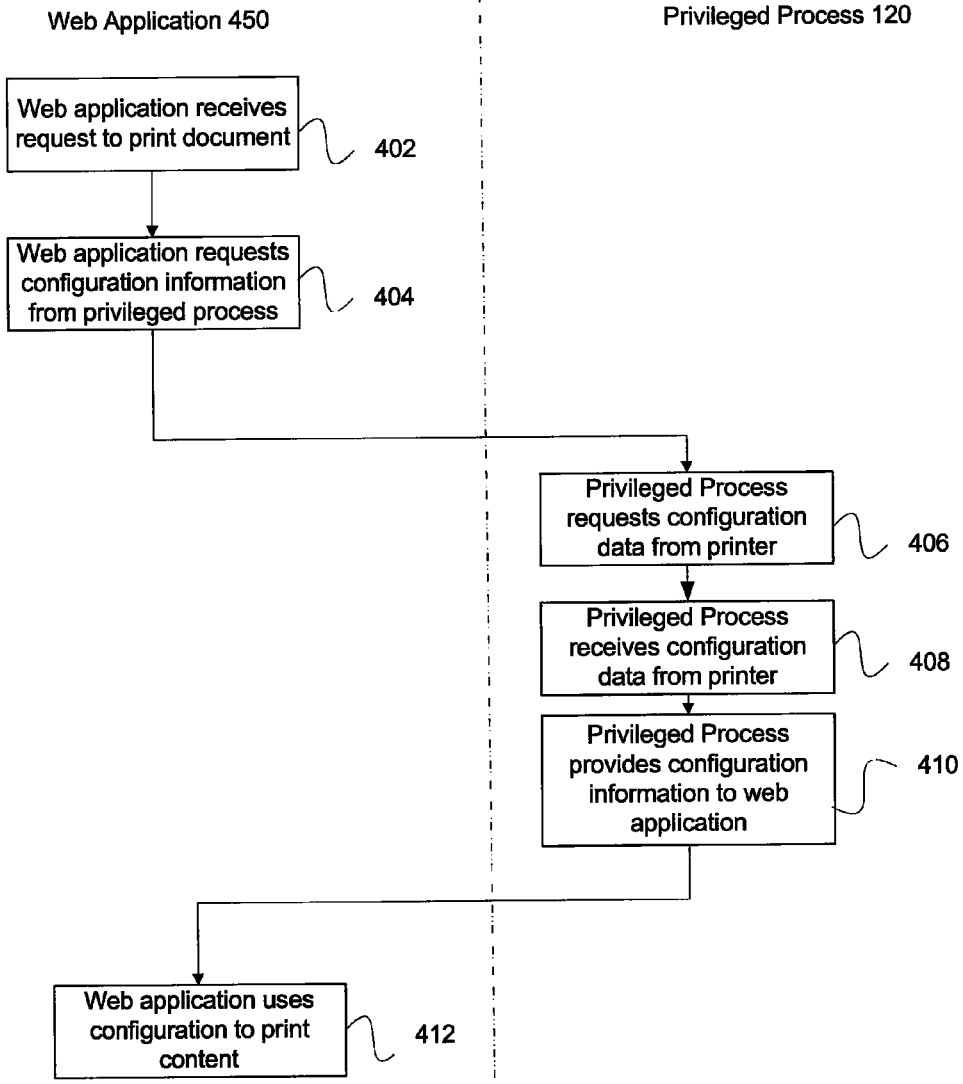
FIG. 4B is a flowchart illustrating automatic querying of printer configuration, according to an embodiment of the invention.

FIG. 4B is a flowchart illustrating automatic query and retrieval of configuration information 306 associated with printer 140 by web application 450.

Method 400 begins with web application 450 receiving a request to print content (step 402). User 104, for example, may provide a request to print a document through a print menu in web application 450. In the example where web application 450 is a web browser, user 104 may provide a request to print web content.

Web application 450 may then request configuration information 306 associated with printer 140 from privileged process 120 (step 404).

Privileged process 120 then requests configuration information 306 from printer 140 (step 406). As an example, configuration information may include settings related to resolution, font and page layout associated with printer 140.

Privileged process 120 may then receive configuration information 306 from printer communication subsystem 130 (step 408).

Privileged process 120 then provides the configuration information 306 to application 450 (step 410).

Web application 450 may then use printer configuration information 306 to print content (step 412). In another embodiment, printer configuration information 306 may be presented in the form of a graphical user interface menu to user 104 by application 450. As an example, configuration information 306 that is presented may allow user 104 to select resolution, font and page layout.

In this way, an application, for example a web based application, may automatically query printer settings. Automatic query of printer settings using a privileged process may allow web applications to integrate seamlessly into a computing environment while allowing a more secure computing environment.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of cross-process printing, comprising:
   executing a first process and a second process within a common computing device:
   the first process including:
   receiving a request to execute a print job using an output device;
   receiving configuration information including one or more settings related to the output device from the second process;
   processing a configuration selection that is based on the configuration information and an input from a user;
   generating a drawing command for the print job based on the processing a configuration selection; wherein generating a drawing command includes generating a serialized buffer of content to be printed at the output device based on the configuration selection;
   providing the drawing command and the serialized buffer to the second process to execute the print job using the output device; and
   wherein the second process directly communicates with the output device via a communication subsystem, and the first process is restricted from directly communicating with the output device and the communication subsystem.

2. The method of claim 1, further comprising:
   providing, by the second process, the drawing command to the communication subsystem; and
   generating, by the communication subsystem, raw printer commands using the drawing command.

3. The method of claim 1, further comprising:
   providing the raw printer commands to the output device, wherein the output device is a printer.

4. The method of claim 1, wherein the processing comprises:
   providing the configuration information to the user; and
   receiving the input from the user to select a configuration based on the configuration information.

5. The method of claim 4, wherein the providing comprises:
   displaying a user interface menu to the user to allow selection of the configuration.

6. The method of claim 1, further comprising sanitizing the serialized buffer.

7. The method of claim 4, further comprising:
   canceling initiation of the print job if the receiving the input from the user includes receiving a cancel command.

8. The method of claim 1, further comprising:
   sending a query to the second process to retrieve the configuration information.

9. The method of claim 1, wherein the configuration information includes settings related to resolution, font, or page layout associated with the print job.

10. A system for cross-process printing, comprising:
    a printer communication subsystem, using a computer-based system, configured to:
    receive a request for configuration information from a privileged process, wherein the request for configuration information is based on a request to execute a print job, a restricted process provides the request to execute the print job to the privileged process, and the restricted and privileged processes are executed within a common computing device;
    send configuration information to the privileged process based on the request for configuration information;
    receive a drawing command from the privileged process, wherein the drawing command is based on a user selected configuration, the restricted process generates a serialized buffer of a document to be printed at an output device based on the user selected configuration, and provides the drawing command and the serialized buffer to the privileged process, and the drawing command includes a plurality of generic commands to render content in a printable form at the output device;
    convert the drawing command to one or more raw printer commands; and
    forward the one or more raw printer commands to the output device, wherein the output device prints data based on the one or more raw printer commands,
    wherein the privileged process directly communicates with the output device via the printer communication subsystem, and the restricted process is restricted from directly communicating with the output device and the printer communication subsystem.

11. The system of claim 10,
    wherein the output device is a printer configured to print data based on the one or more raw printer commands.

12. The system of claim 10, wherein the serialized buffer includes one or more bytes associated with content of the document being printed.

13. The system of claim 10, further comprising:
    a printer, wherein the printer communication subsystem receives responses related to printed content from the printer.

14. The system of claim 10, wherein the restricted process is an instantiation of an application.

15. The system of claim 14, wherein the application is a web based application.

16. The system of claim 10, wherein the restricted process cannot communicate directly with the output device.

17. The system of claim 14, wherein the application automatically retrieves the configuration information associated with the output device.

18. A non-transitory computer readable storage medium encoded with a computer program, the program comprising instructions that when executed by one or more computers cause the one or more computers to perform operations to
cause a first process to:
receive a request to execute a print job using an output device;
receive configuration information including one or more settings related to the output device from a second process, the second process being able to directly communicate with the output device via a communication subsystem, and the first process being restricted from directly communicating with the output device and the communication subsystem;
process a configuration selection that is based on the configuration information and an input from a user;
generate a drawing command for the print job based on the processing of the configuration selection, wherein the generation of a drawing command includes instructions that when executed by the one or more computers cause the one or more computers to perform operations to generate a serialized buffer of content to be printed at the output device based on the configuration selection; and
provide the drawing command and the serialized buffer to the second process to execute the print job using the output device
wherein the first and second processes are executed within a common computing device.

* * * * *